US012785134B2

(12) United States Patent
Feng et al.

(10) Patent No.: US 12,785,134 B2
(45) Date of Patent: Nov. 3, 2026

(54) ELECTRODE PLATE STACKING METHOD AND APPARATUS, AND STACKING MACHINE

(71) Applicant: CONTEMPORARY AMPEREX TECHNOLOGY (HONG KONG) LIMITED, Hong Kong (CN)

(72) Inventors: Shiping Feng, Ningde (CN); Jun Hu, Ningde (CN); Canbin Chen, Ningde (CN); Wen Chang, Ningde (CN); Qiuhui Zheng, Ningde (CN); Qing Wu, Ningde (CN); Haoran Lu, Ningde (CN); Jiayi Zhao, Ningde (CN); Yitai Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 326 days.

(21) Appl. No.: 18/413,083

(22) Filed: Jan. 16, 2024

(65) Prior Publication Data

US 2024/0154149 A1 May 9, 2024

Related U.S. Application Data

(63) Continuation of application No. PCT/CN2022/070630, filed on Jan. 7, 2022.

(51) Int. Cl.
*H01M 10/04* (2006.01)

(52) U.S. Cl.
CPC ..... *H01M 10/045* (2013.01); *H01M 10/0404* (2013.01)

(58) Field of Classification Search
CPC ................ B65H 39/14; B65H 2801/72; Y10T 29/49108; Y10T 29/49112;
(Continued)

(56) References Cited

U.S. PATENT DOCUMENTS 8,870,977 B2 * 10/2014 Lee .................... H01M 10/125 429/211
2006/0088759 A1 * 4/2006 Roh ................. H01M 10/0459 429/130

(Continued)

FOREIGN PATENT DOCUMENTS

CN 102916160 A 2/2013
CN 208042987 U 11/2018

(Continued)

OTHER PUBLICATIONS

KR-20120105211-A Translation from FIT database (Year: 2026).*

(Continued)

*Primary Examiner* — Thomas J Hong
(74) *Attorney, Agent, or Firm* — XSENSUS LLP

(57) ABSTRACT

An electrode plate stacking method includes: determining, based on a first electrode plate, a conveying order of a plurality of second electrode plates, the first electrode plate being a continuous electrode plate, the plurality of second electrode plates including at least one upper electrode plate and at least one lower electrode plate, the plurality of second electrode plates being discontinuous electrode plates, and the conveying order being used for conveying the at least one upper electrode plate and the at least one lower electrode plate alternately; generating an identifier sequence for the plurality of second electrode plates based on the conveying order; and collecting first image data of each of the plurality of second electrode plates based on the identifier sequence in a process of conveying the plurality of second electrode plates in the conveying order.

20 Claims, 7 Drawing Sheets

(58) Field of Classification Search
CPC ......... Y10T 29/49114; Y10T 29/53135; Y10T 29/53139; H01M 10/0404; H01M 10/045; H01M 10/0454; H01M 10/0583; H01M 10/125; H01M 10/14
See application file for complete search history.

(56) References Cited

U.S. PATENT DOCUMENTS

| | | | | |
|---|---|---|---|---|
| 2010/0015529 | A1* | 1/2010 | Kim | H01M 10/0413 429/246 |
| 2011/0274960 | A1* | 11/2011 | Ahn | H01M 50/403 29/623.2 |
| 2014/0050957 | A1* | 2/2014 | Yang | H01M 50/466 429/142 |
| 2014/0230239 | A1* | 8/2014 | Sato | H01M 10/0583 29/730 |
| 2014/0272537 | A1* | 9/2014 | Kretschmar | H01M 50/538 429/149 |
| 2015/0162638 | A1* | 6/2015 | Bernini | H01M 10/0459 429/142 |
| 2016/0164069 | A1 | 6/2016 | Takahashi et al. | |
| 2019/0229360 | A1* | 7/2019 | Böhm | H01M 10/0404 |
| 2019/0237797 | A1* | 8/2019 | Cho | H01M 10/0431 |
| 2019/0334158 | A1* | 10/2019 | Choi | H01M 10/052 |
| 2019/0341658 | A1* | 11/2019 | Han | H01M 10/052 |
| 2020/0235433 | A1* | 7/2020 | Kim | H01M 10/0585 |
| 2021/0005868 | A1 | 1/2021 | Miyoshi et al. | |
| 2021/0408609 | A1* | 12/2021 | Nanni | B26D 1/065 |
| 2022/0021016 | A1* | 1/2022 | Zhao | H01M 10/045 |
| 2022/0336840 | A1* | 10/2022 | Yao | H01M 10/0583 |
| 2022/0384851 | A1* | 12/2022 | Lee | H01M 10/0583 |
| 2023/0261249 | A1* | 8/2023 | Yamashita | H01M 10/04 429/163 |
| 2023/0411669 | A1* | 12/2023 | Lim | H01M 10/0413 |

FOREIGN PATENT DOCUMENTS

| | | | | | |
|---|---|---|---|---|---|
| CN | 208622872 | U | | 3/2019 | |
| CN | 112310487 | A | | 2/2021 | |
| CN | 113302777 | A | | 8/2021 | |
| CN | 113517465 | A | | 10/2021 | |
| CN | 113574710 | A | | 10/2021 | |
| CN | 113706498 | A | | 11/2021 | |
| JP | 2013-030376 | A | | 2/2013 | |
| JP | 2018-073754 | A | | 5/2018 | |
| JP | 2020-068050 | A | | 4/2020 | |
| JP | 2023-504474 | A | | 2/2023 | |
| KR | 10-2012-0105211 | A | | 9/2012 | |
| KR | 10-2013-0015398 | A | | 2/2013 | |
| KR | 10-2013-0124098 | A | | 11/2013 | |
| KR | 10-2017-0059740 | A | | 5/2017 | |
| KR | 20190051624 | A | * | 5/2019 | B25J 9/1674 |
| KR | 10-2020-0058956 | A | | 5/2020 | |
| WO | 2021/109363 | A1 | | 6/2021 | |

OTHER PUBLICATIONS

KR 20130124098 A translation from FIT database (Year: 2026).*
KR 20170059740 A translation from FIT database (Year: 2026).*
CN 208622872 U translation from FIT database (Year: 2026).*
KR-20190051624-A translation from FIT database (Year: 2026).*
KR 20200058956 A translation from FIT database (Year: 2026).*
CN 112310487 A translation from FIT database (Year: 2026).*
JP 2020068050 A translation from FIT database (Year: 2026).*
Notice of the Granting of a Patent Right for an Invention issued Nov. 12, 2025 in Chinese Patent Application No. 202280020503.8 with English translation thereof.
Office Action issued Mar. 21, 2025 in Japanese Patent Application No. 2024-502061 with English translation thereof.
International Search Report and Written Opinion mailed on May 18, 2022, received for PCT Application PCT/CN2022/070630, filed on Jan. 7, 2022, 11 pages including English Translation.
Office Action issued May 19, 2025 in Korean Patent Application No. 10-2024-7001423 with machine English translation.
Extended European Search Report issued Oct. 18, 2024 in European Patent Application 22917812.4.

* cited by examiner

ELECTRODE PLATE STACKING METHOD AND APPARATUS, AND STACKING MACHINE

CROSS-REFERENCE TO RELATED APPLICATION

The present application is a continuation of International Application No. PCT/CN2022/070630, filed Jan. 7, 2022, which is incorporated herein by reference in its entirety.

TECHNICAL FIELD

The present application relates to the field of traction batteries, and in particular, to an electrode plate stacking method and apparatus, and a stacking machine.

BACKGROUND ART

Energy conservation and emission reduction are the keys to the sustainable development of the automobile industry. In this case, electric vehicles have become an important part of the sustainable development of the automobile industry due to their advantages in energy conservation and environmental protection. For the electric vehicles, the battery technology is an important factor related to their development.

One of the core manufacturing processes of traction batteries is the stacking process. In the production procedures of the stacking process, generally, a negative electrode plate, a separator, a positive electrode plate, a separator, a negative electrode plate, . . . , are stacked sequentially from bottom to top, or a positive electrode plate, a separator, a negative electrode plate, a separator, a positive electrode plate, . . . , are stacked sequentially from bottom to top. After a battery cell is assembled by stacking, if any abnormality occurs in the battery cell subsequently, it may be necessary to replace the entire battery cell because an electrode plate in which the abnormality occurs cannot be determined, resulting in a higher scrap rate of the battery cell.

SUMMARY OF THE DISCLOSURE

Embodiments of the present application provide an electrode plate stacking method and apparatus, and a stacking machine, which can effectively reduce the scrap rate of battery cells.

In a first aspect, there is provided an electrode plate stacking method, including: determining, based on a first electrode plate, a conveying order of a plurality of second electrode plates, the first electrode plate being a continuous electrode plate, the plurality of second electrode plates including at least one upper electrode plate and at least one lower electrode plate, the plurality of second electrode plates being discontinuous electrode plates, and the conveying order being used for conveying the at least one upper electrode plate and the at least one lower electrode plate alternately; generating an identifier sequence for the plurality of second electrode plates based on the conveying order; and collecting first image data of each of the plurality of second electrode plates based on the identifier sequence in a process of conveying the plurality of second electrode plates in the conveying order.

In this embodiment of the present application, the identifier sequence for the second electrode plates is generated based on the conveying order of the second electrode plates, and the image data of each second electrode plate is collected based on the identifier sequence for the second electrode plates in the process of conveying the second electrode plates in the conveying order, such that the collected image data of each second electrode plate corresponds to an identifier sequence thereof. In this way, if an abnormality occurs in a battery cell, an electrode plate in which the abnormality occurs can be determined based on the collected image data and the corresponding identifier sequence of the second electrode plate, and then the electrode plate in which the abnormality occurs can be handled instead of replacing the entire battery cell, which greatly reduces the scrap rate of the battery cell.

Further, the first electrode plate is a continuous electrode plate. Compared with first cutting an electrode plate into sheets and then stacking them, this embodiment of the present application has the advantage that there is no need to cut the first electrode plate, which effectively improves the efficiency of subsequent stacking. In addition, because the first electrode plate is a continuous electrode plate, a position relationship between the first electrode plate and the second electrode plate can be better controlled when the first electrode plate and the second electrode plate are stacked, which is conducive to improving the precision between the first electrode plate and the second electrode plate. Moreover, since the precision is improved, the position relationship between the first electrode plate and the second electrode plate can be maximized, and the energy density of an electrode plate with a same area is higher, thereby increasing the energy density of the battery.

In some possible implementations, the method further includes: storing the identifier sequence and the first image data, where the identifier sequence is in a one-to-one correspondence with the first image data.

In the above technical solution, the identifier sequence and the first image data of the second electrode plates are stored, such that the first image data of each second electrode plate can be traced and queried. In this way, when an abnormality occurs in a battery cell, an electrode plate in which the abnormality occurs can be directly determined based on the identifier sequence and the first image data that are stored, which is not only simple to implement, but also effectively reduces the processing time.

In some possible implementations, the determining, based on a first electrode plate, a conveying order of a plurality of second electrode plates includes: obtaining fold information of the first electrode plate, the fold information being used to indicate whether at least one fold on the first electrode plate is located on an upper surface or a lower surface of the first electrode plate; and determining the conveying order based on the fold information.

In the above technical solution, the conveying order of the upper electrode plate and the lower electrode plate in the second electrode plates is determined based on the fold on the first electrode plate. Therefore, the implementation is easy, and the conveying order of the second electrode plates can be intuitively determined. In addition, there are a plurality of folds on the first electrode plate, which facilitates subsequent folding.

In some possible implementations, if the fold information is used to indicate that a first fold of the at least one fold is located on the upper surface of the first electrode plate, one of the plurality of second electrode plates that is to be first conveyed is a first upper electrode plate of the at least one upper electrode plate; or if the fold information is used to indicate that the first fold of the at least one fold is located on the lower surface of the first electrode plate, one of the plurality of second electrode plates that is to be first conveyed is a first lower electrode plate of the at least one lower electrode plate.

In the above technical solution, when the fold is located on the upper surface of the first electrode plate, the second electrode plate to be first conveyed is the upper electrode plate, and when the fold is located on the lower surface of the first electrode plate, the second electrode plate to be first conveyed is the lower electrode plate, so that the second electrode plate can cover the fold on the first electrode plate, thereby meeting process production requirements.

In some possible implementations, the method further includes: generating a first identifier for the at least one upper electrode plate and a second identifier for the at least one lower electrode plate when the continuous second electrode plate is cut into the at least one upper electrode plate and the at least one lower electrode plate; and storing the first identifier in a first stack list and storing the second identifier in a second stack list.

In the above technical solution, the first identifier for the upper electrode plate and the second identifier for the lower electrode plate are stored in different stack lists, which prevents the problem of confusion between the first identifier and the second identifier, for example, prevents the first identifier from being mistaken for the second identifier or the second identifier from being mistaken for the first identifier, thereby facilitating subsequent process.

In some possible implementations, the generating an identifier sequence for the plurality of second electrode plates based on the conveying order includes: popping the first identifier in the first stack list and the second identifier in the second stack list alternately based on the conveying order, where identifiers in a same stack list are popped in a first-in first-out order; and storing the popped first identifier and the popped second identifier in a third stack list based on the order of popping the first identifier and the second identifier alternately, a sequence in the third stack list being the identifier sequence.

In some possible implementations, the stacking method is applied to a stacking machine, the stacking machine includes a first image obtaining apparatus, and the collecting first image data of each of the plurality of second electrode plates based on the identifier sequence includes: sequentially popping the identifier sequence in the third stack list when the second electrode plates are conveyed; and triggering the first image obtaining apparatus by the popped identifier sequence such that the image obtaining apparatus collects the first image data.

In the above technical solution, the first identifier and the second identifier are stored alternately in the third stack list based on the conveying order of the second electrode plates, that is, the identifier sequence in the third stack list corresponds to the conveying order. In this way, when the first image obtaining apparatus is triggered by the popped identifier sequence to collect the first image data of the second electrode plates, the collected first image data also corresponds to the conveying order of the second electrode plates, which facilitates subsequent process processing. Further, the first image obtaining apparatus is triggered by the identifier sequence to collect the first image data, such that the first image data has a strong correlation with the identifier sequence. In this way, if an abnormality occurs in a battery cell, an electrode plate in which the abnormality occurs can be determined within a shorter period of time based on the first image data and its correlated identifier sequence.

In some possible implementations, the first image obtaining apparatus includes a first image obtaining sub-apparatus and a second image obtaining sub-apparatus, and the triggering the first image obtaining apparatus by the popped identifier sequence such that the image obtaining apparatus collects the first image data includes: if the popped identifier is the first identifier in the identifier sequence, triggering the first image obtaining sub-apparatus to collect the first image data; or if the popped identifier is the second identifier in the identifier sequence, triggering the second image obtaining sub-apparatus to collect the first image data.

In some possible implementations, the obtaining fold information of the first electrode plate includes: performing cut hole detection on the first electrode plate; and after a cut hole in the first electrode plate is detected, triggering a second image obtaining apparatus to collect second image data of the first electrode plate, the second image data being used to obtain the fold information.

In the above technical solution, the second image obtaining apparatus is triggered, by detecting the cut hole in the first electrode plate, to collect the image data of the first electrode plate. Since the cut hole is relatively easy to detect, the following problem can be avoided: the image data of the first electrode plate that is collected by the second image obtaining apparatus is invalid due to false detection, or the second image obtaining apparatus fails to collect the image data of the first electrode plate due to false detection.

In some possible implementations, the method further includes: when the at least one fold reaches a conveying position of the plurality of second electrode plates, conveying the at least one upper electrode plate and the at least one lower electrode plate alternately in the conveying order.

In the above technical solution, when the fold on the first electrode plate reaches the conveying position of the second electrode plates, the at least one upper electrode plate and the at least one lower electrode plate are conveyed alternately, which can ensure precise alignment between the second electrode plate and the first electrode plate, and improve the precision of the battery cell.

In some possible implementations, the first electrode plate is a negative electrode plate, the second electrode plate is a positive electrode plate, the upper electrode plate is an upper positive electrode plate, and the lower electrode plate is a lower positive electrode plate.

In the above technical solution, the first electrode plate is set as a negative electrode plate and the second electrode plate is set as a positive electrode plate, which can meet process production requirements and facilitate stacking of the first electrode plate and the second electrode plate.

In a second aspect, there is provided an electrode plate stacking apparatus, including: a processing unit configured to determine, based on a first electrode plate, a conveying order of a plurality of second electrode plates, the first electrode plate being a continuous electrode plate, the plurality of second electrode plates including at least one upper electrode plate and at least one lower electrode plate, the plurality of second electrode plates being discontinuous electrode plates, and the conveying order being used for conveying the at least one upper electrode plate and the at least one lower electrode plate alternately; a generation unit configured to generate an identifier sequence for the plurality of second electrode plates based on the conveying order; and a collection unit configured to collect first image data of each of the plurality of second electrode plates based on the identifier sequence in a process of conveying the plurality of second electrode plates in the conveying order.

In some possible implementations, the processing unit is further configured to: store the identifier sequence and the first image data, where the identifier sequence is in a one-to-one correspondence with the first image data.

In some possible implementations, the processing unit is specifically configured to: obtain fold information of the first electrode plate, the fold information being used to indicate whether at least one fold on the first electrode plate is located on an upper surface or a lower surface of the first electrode plate; and determine the conveying order based on the fold information.

In some possible implementations, if the fold information is used to indicate that a first fold of the at least one fold is located on the upper surface of the first electrode plate, one of the plurality of second electrode plates that is to be first conveyed is a first upper electrode plate of the at least one upper electrode plate; or if the fold information is used to indicate that the first fold of the at least one fold is located on the lower surface of the first electrode plate, one of the plurality of second electrode plates that is to be first conveyed is a first lower electrode plate of the at least one lower electrode plate.

In some possible implementations, the generation unit is further configured to: generate a first identifier for the at least one upper electrode plate and a second identifier for the at least one lower electrode plate when the continuous second electrode plate is cut into the at least one upper electrode plate and the at least one lower electrode plate; and the processing unit is further configured to: store the first identifier in a first stack list and store the second identifier in a second stack list.

In some possible implementations, the processing unit is further configured to: pop the first identifier in the first stack list and the second identifier in the second stack list alternately based on the conveying order, where identifiers in a same stack list are popped in a first-in first-out order; and store the popped first identifier and the popped second identifier in a third stack list based on the order of popping the first identifier and the second identifier alternately, a sequence in the third stack list being the identifier sequence.

In some possible implementations, the stacking apparatus includes a first image obtaining apparatus, and the processing unit is further configured to: sequentially pop the identifier sequence in the third stack list when the second electrode plates are conveyed; and trigger the first image obtaining apparatus by the popped identifier sequence such that the image obtaining apparatus collects the first image data.

In some possible implementations, the first image obtaining apparatus includes a first image obtaining sub-apparatus and a second image obtaining sub-apparatus, and the processing unit is specifically configured to: if the popped identifier is the first identifier in the identifier sequence, trigger the first image obtaining sub-apparatus to collect the first image data; or if the popped identifier is the second identifier in the identifier sequence, trigger the second image obtaining sub-apparatus to collect the first image data.

In some possible implementations, the processing unit is specifically configured to: perform cut hole detection on the first electrode plate; and after a cut hole in the first electrode plate is detected, trigger a second image obtaining apparatus to collect second image data of the first electrode plate, the second image data being used to obtain the fold information.

In some possible implementations, the electrode plate stacking apparatus further includes: a conveying unit configured to: when the at least one fold reaches a conveying position of the plurality of second electrode plates, convey the at least one upper electrode plate and the at least one lower electrode plate alternately in the conveying order.

In some possible implementations, the first electrode plate is a negative electrode plate, the second electrode plate is a positive electrode plate, the upper electrode plate is an upper positive electrode plate, and the lower electrode plate is a lower positive electrode plate.

In a third aspect, there is provided a stacking machine, including: the electrode plate stacking apparatus in the second aspect.

BRIEF DESCRIPTION OF THE DRAWINGS

In order to illustrate the technical solutions of the embodiments of the present application more clearly, the accompanying drawings required in the embodiments of the present application will be described briefly below. Obviously, the accompanying drawings described below are merely some embodiments of the present application, and for those of ordinary skill in the art, other accompanying drawings can also be obtained from these accompanying drawings without any creative efforts.

DETAILED DESCRIPTION OF EMBODIMENTS

Figure 1:
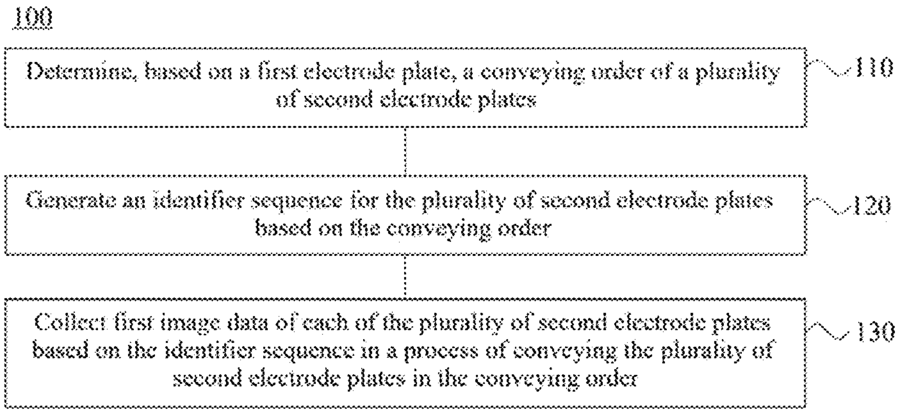
FIG. 1 is a schematic flowchart of an electrode plate stacking method according to an embodiment of the present application.

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the accompanying drawings, but do not limit the specific structure in the present application. In the description of the present application, it should also be noted that the terms "mounting", "connect", and "connection" should be interpreted in the broad sense unless explicitly defined and limited otherwise. For example, the connection may be a fixed connection, a detachable connection, or an integral connection, or may be a direct connection, or an indirect connection by means of an intermediate medium. For those of ordinary skill in the art, the specific meanings of the terms mentioned above in the present application can be construed according to specific circumstances.

The term "and/or" in the present application is merely a description of the associated relationship of associated objects, representing that three relationships may exist, for example, A and/or B, may be expressed as: A exists, both A and B exist, and B exists. In addition, the character "/" in the present application generally indicates that the associated objects before and after the character are in a relationship of "or".

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application or the foregoing accompanying drawings are used to distinguish between different objects, rather than describing a specific order or a primary-secondary relationship.

In the present application, the phrase "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment. Those skilled in the art should understand, in explicit and implicit manners, that an embodiment described in the present application may be combined with another embodiment.

In the present application, "a plurality of" means two or more (including two), similarly, "a plurality of groups" means two or more groups (including two groups), "a plurality of sheets" means two or more sheets (including two sheets), and "a plurality of columns" means two or more columns (including two columns).

In the context of the automotive industry using conventional energy sources for power supply, environmental pollution issues are becoming increasingly severe. Actively developing new energy vehicles can help reduce the damage to the environment. For the new energy vehicles, the battery technology is a key factor to their development.

A battery refers to a physical module including one or more battery cells to provide electric energy. For example, the battery mentioned in the present application may include a battery module or a battery pack, etc. The battery generally includes a case for packaging one or more battery cells. The case can prevent liquid or other foreign matters from affecting charging or discharging of the battery cell(s).

Optionally, the battery cell may include a lithium ion secondary battery, a lithium ion primary battery, a lithium-sulfur battery, a sodium/lithium ion battery, a sodium ion battery or a magnesium ion battery, etc., which is not limited in the embodiments of the present application. In some embodiments, the battery cell may also be referred to as a cell.

The battery cell includes an electrode assembly and an electrolyte solution. The electrode assembly is composed of a positive electrode plate, a negative electrode plate, and a separator. The battery cell operates mainly by relying on movements of metal ions between the positive electrode plate and the negative electrode plate. The positive electrode plate includes a positive electrode current collector and a positive electrode active material layer. A surface of the positive electrode current collector is coated with the positive electrode active material layer, the positive electrode current collector not coated with the positive electrode active material layer protrudes from the positive electrode current collector coated with the positive electrode active material layer, and the positive electrode current collector not coated with the positive electrode active material layer serves as a positive tab. Taking a lithium ion battery as an example, the positive electrode current collector may be made of an aluminum, and the positive electrode active material may be lithium cobalt oxide, lithium iron phosphate, ternary lithium, lithium manganate, etc. The negative electrode plate includes a negative electrode current collector and a negative electrode active material layer. A surface of the negative electrode current collector is coated with the negative electrode active material layer, the negative electrode current collector not coated with the negative electrode active material layer protrudes from the negative electrode current collector coated with the negative electrode active material layer, and the negative electrode current collector not coated with the negative electrode active material layer serves as a negative tab. The negative electrode current collector may be made of copper, and the negative electrode active material may be carbon, silicon, etc. In order to ensure that no fusing occurs when a large current passes, a plurality of positive tabs are provided and are stacked together, and a plurality of negative tabs are provided and are stacked together. The separator may be made of polypropylene (PP) or polyethylene (PE), etc.

At present, the production methods of battery cells mainly include a winding method and a stacking method. In the winding method, a battery cell is formed by shaping positive electrode plates and negative electrode plates into continuous and long sheets, and then winding the electrode plates together with a separator therebetween. A battery formed by the battery cell has the problem of stress concentration at a bending part of the electrode plates, and long-term accumulation of expansion and contraction of the electrode plates during charging and discharging may cause deformation of the electrode plates, which affects the performance of the battery.

In the stacking method, positive electrode plates and negative electrode plates are formed into individual sheets by cutting, and placed sequentially and alternately in a Z-shaped folded separator, with the positive electrode plate and the negative electrode plate being separated by the separator. A battery formed in this manner has the advantages of low internal resistance, good cycling performance, and capabilities of high-rate charging and discharging, making it suitable as a power source, and thus receiving more and more attention.

However, after a battery cell is assembled by stacking, if any abnormality occurs in the battery cell subsequently, for example, a failure occurs in an electrode plate in the battery cell, it may be necessary to replace the entire battery cell because the electrode plate in which the failure occurs cannot be determined, resulting in a higher scrap rate of the battery cell.

In view of this, an embodiment of the present application provides an electrode plate stacking method, which can effectively reduce the scrap rate of battery cells.

FIG. 1 is a schematic flowchart of an electrode plate stacking method 100 according to an embodiment of the present application. Optionally, the method 100 may be applied to a stacking machine. The method 100 may include at least part of the following content:

- 110: determining, based on a first electrode plate, a conveying order of a plurality of second electrode plates, where the first electrode plate is a continuous electrode plate, the plurality of second electrode plates include at least one upper electrode plate and at least one lower electrode plate, the plurality of second electrode plates are discontinuous electrode plates, and the conveying order is used for conveying the at least one upper electrode plate and the at least one lower electrode plate alternately;
- 120: generating an identifier sequence for the plurality of second electrode plates based on the conveying order; and
- 130: collecting first image data of each of the plurality of second electrode plates based on the identifier sequence in a process of conveying the plurality of second electrode plates in the conveying order.

In this embodiment of the present application, the identifier sequence for the second electrode plates is generated based on the conveying order of the second electrode plates, and the image data of each second electrode plate is collected based on the identifier sequence for the second electrode plates in the process of conveying the second electrode plates in the conveying order, such that the collected image data of each second electrode plate corresponds to an identifier sequence thereof. In this way, if an abnormality occurs in a battery cell, an electrode plate in which the abnormality occurs can be determined based on the collected image data and the corresponding identifier sequence of the second electrode plate, and then the electrode plate in which the abnormality occurs can be handled instead of replacing the entire battery cell, which greatly reduces the scrap rate of the battery cell.

Further, the first electrode plate is a continuous electrode plate. Compared with first cutting an electrode plate into sheets and then stacking them, this embodiment of the present application has the advantage that there is no need to cut the first electrode plate, which effectively improves the efficiency of subsequent stacking. In addition, because the first electrode plate is a continuous electrode plate, a position relationship between the first electrode plate and the second electrode plate can be better controlled when the first electrode plate and the second electrode plate are stacked, which is conducive to improving the precision between the first electrode plate and the second electrode plate. Moreover, since the precision is improved, the position relationship between the first electrode plate and the second electrode plate can be maximized, and the energy density of an electrode plate with a same area is higher, thereby increasing the energy density of the battery.

Optionally, the first image data may include, but not limited to, a position of each second electrode plate relative to the first electrode plate, a station where each second electrode plate is currently located, etc.

Optionally, the first electrode plate may be a negative electrode plate, the second electrode plate may be a positive electrode plate, the upper electrode plate may be an upper positive electrode plate, and the lower electrode plate may be a lower positive electrode plate.

The first electrode plate is set as a negative electrode plate and the second electrode plate is set as a positive electrode plate, which can meet process production requirements and facilitate stacking of the first electrode plate and the second electrode plate.

It should be understood that names of the negative electrode plate and the positive electrode plate are not specifically limited in this embodiment of the present application, that is, they may alternatively have other names. For example, a positive electrode plate may alternatively be called a cathode electrode plate, and a negative electrode plate may alternatively be called an anode electrode plate.

The solution of this embodiment of the present application is described below using an example in which the first electrode plate is a negative electrode plate and the second electrode plate is a positive electrode plate. However, it should be understood that this is not limited in this embodiment of the present application.

Optionally, in some embodiments, 110 may specifically include: obtaining fold information of a negative electrode plate, and determining a conveying order of a plurality of positive electrode plates based on the fold information, where the fold information is used to indicate whether at least one fold on the negative electrode plate is located on an upper surface or a lower surface of the negative electrode plate.

Optionally, there may be a plurality of cut holes in the negative electrode plate, and the plurality of cut holes may form a fold. The shape of the cut holes may be circular, rectangular, or the like. The cut holes may be through holes. As an example, the through holes may be holes formed in the electrode plate by using a laser cutting head or a cutter, and these holes are sequentially formed at intervals along a width direction of the negative electrode plate and penetrate through the negative electrode plate along a thickness direction thereof.

Alternatively, a fold may refer to a region formed on the negative electrode plate and where a thickness within the region is less than that in the other positions. For example, the negative electrode plate may be thinned at some regions, and the regions obtained after the thinning may be regions on the negative electrode plate where the fold is formed.

Optionally, the obtaining fold information of a negative electrode plate may specifically include: performing cut hole detection on the negative electrode plate, and after a cut hole in the negative electrode plate is detected, triggering a second image obtaining apparatus to collect second image data of the negative electrode plate, the second image data being used to obtain the fold information.

Figure 2:
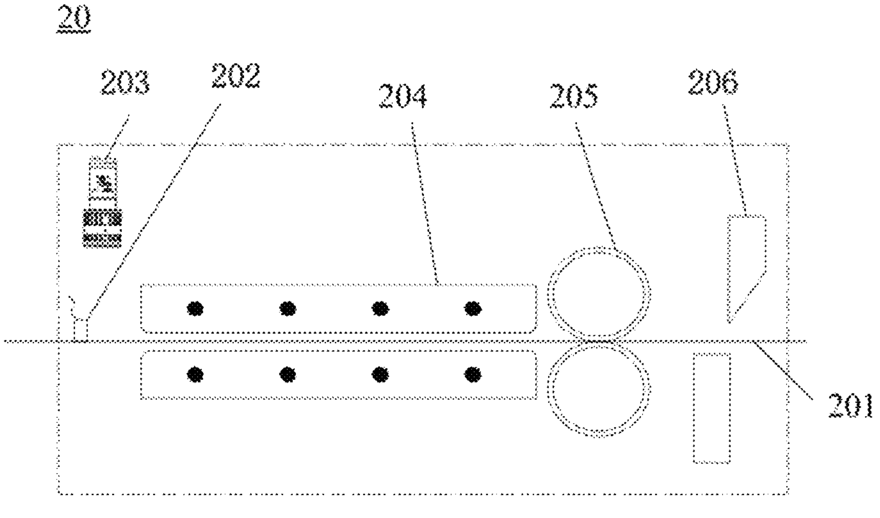
FIG. 2 is a schematic diagram of a cutting and conveying station for negative electrode plates according to an embodiment of the present application.

For example, as shown in FIG. 2, when a negative electrode plate 201 passes through a station 20, a cut hole detection sensor 202 at the station 20 may perform cut hole detection on the negative electrode plate 201. If a cut hole is detected, the cut hole detection sensor 202 may send a detection signal to a programmable logic controller (PLC) control system. After receiving the detection signal, the PLC control system triggers the second image obtaining apparatus 203 at the station 20 to collect second image data, for example, triggers the second image obtaining apparatus 203 to capture images.

The cut hole detection sensor 202 may be, for example, an optical fiber sensor, and the second image obtaining apparatus 203 may be, for example, a charge-coupled device (CCD) for image capturing.

In this technical solution, the second image obtaining apparatus is triggered, by detecting the cut hole in the negative electrode plate, to collect the image data of the negative electrode plate. Since the cut hole is relatively easy to detect, the following problem can be avoided: the image data of the negative electrode plate that is collected by the second image obtaining apparatus is invalid due to false detection, or the second image obtaining apparatus fails to collect the image data of the negative electrode plate due to false detection.

Referring to FIG. 2 again, in addition to the cut hole detection sensor 202 and the second image obtaining apparatus 203, the station 20 shown in FIG. 2 includes ovens 204, press rollers 205, and a negative electrode plate cutter 206.

The ovens 204 are arranged upstream of the press rollers 205 in a conveying direction of the negative electrode plate 201 and on both sides of a separator for heating a binder on an upper surface and a lower surface of the separator. The press rollers 205 are configured to press the separator and the negative electrode plate 201 together. Heating the binder enhances the adhesiveness of the binder, and helps bond the separator and the negative electrode plate 201. In addition, the binder on a surface of the separator that is away from the negative electrode plate can further ensure bonding of a positive electrode plate and the separator during subsequent stacking of the positive electrode plate.

The negative electrode plate cutter 206 is arranged downstream of the press rollers 205 in the conveying direction of the negative electrode plate 201. In this embodiment of the present application, the cut hole detection sensor 202 may be further configured to determine a position of a tail piece of the negative electrode plate. After the cut hole detection sensor 202 detects that a fold on the tail piece of the negative electrode plate reaches the negative electrode plate cutting station, the negative electrode plate cutter 206 can cut the negative electrode plate along the fold, thereby completing separation of battery cells.

Further, after a first negative electrode plate of each battery cell is moved to a next station, to ensure that whether a fold on the negative electrode plate is located on an upper surface or a lower surface of the negative electrode plate can be accurately determined, the method 100 may further include: storing the fold information.

For example, the fold information may be stored in a stack list or in the cloud.

Figure 3:
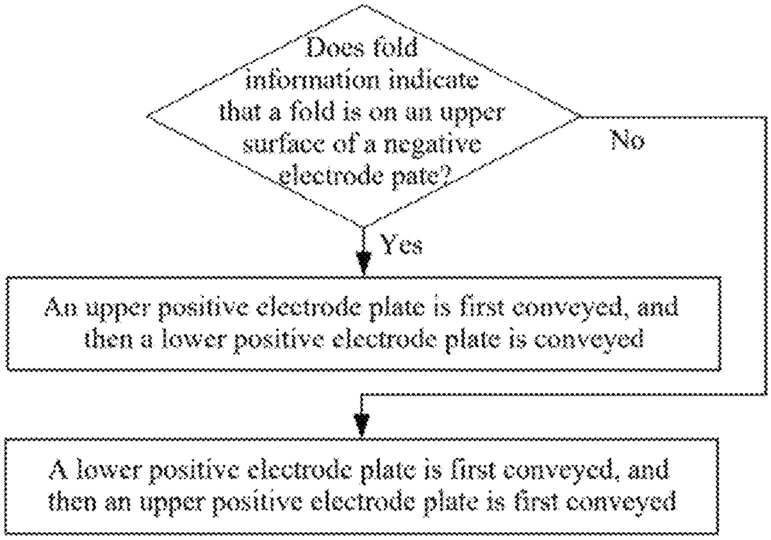
FIG. 3 is a schematic diagram of determining of a conveying order based on fold information according to an embodiment of the present application.

After the fold information is obtained, as shown in FIG. 3, if the fold information is used to indicate that a first fold of the at least one fold is located on the upper surface of the negative electrode plate, one of the plurality of positive electrode plates that is to be first conveyed is an upper positive electrode plate, that is, a first upper positive electrode plate of at least one upper positive electrode plate. Next, the lower positive electrode plate, that is, a first lower positive electrode plate of at least one lower positive electrode plate is conveyed. Then, a second upper positive electrode plate, a second lower positive electrode plate, a third upper positive electrode plate, . . . , are conveyed alternately.

If the fold information is used to indicate that the first fold of the at least one fold is located on the lower surface of the negative electrode plate, one of the plurality of positive electrode plates that is to be first conveyed is a lower positive electrode plate, that is, a first lower positive electrode plate of at least one lower positive electrode plate. Next, the upper positive electrode plate, that is, the first upper positive electrode plate of the at least one upper positive electrode plate is conveyed. Then, a second lower positive electrode plate, a second upper positive electrode plate, a third lower positive electrode plate, . . . , are conveyed alternately.

In the above technical solution, the conveying order of the upper positive electrode plate and the lower positive electrode plate in the positive electrode plates is determined based on the fold on the negative electrode plate. Therefore, the implementation is easy, and the conveying order of the positive electrode plates can be intuitively determined. In addition, there are a plurality of folds on the negative electrode plate, which facilitates subsequent folding.

Moreover, when the fold is located on the upper surface of the negative electrode plate, the positive electrode plate to be first conveyed is the upper positive electrode plate, and when the fold is located on the lower surface of the negative electrode plate, the positive electrode plate to be first conveyed is the lower positive electrode plate, so that the positive electrode plate can cover the fold on the negative electrode plate, thereby meeting process production requirements.

Before the positive electrode plates are conveyed in the conveying order, since the positive electrode plates are discontinuous, there is a further need to cut the positive electrode plate in this embodiment of the present application.

Figure 4:
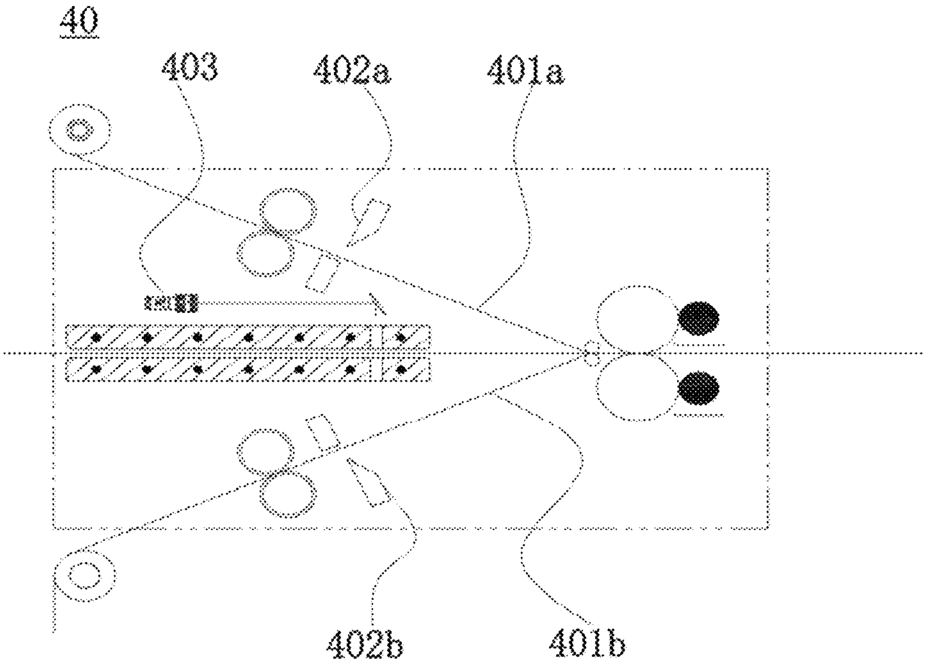
FIG. 4 is a schematic diagram of a cutting and conveying station for positive electrode plates according to an embodiment of the present application.

FIG. 4 is a schematic diagram of a cutting station 40 for positive electrode plates. 401*a* represents an upper positive electrode plate, 401*b* represents a lower positive electrode plate, and a positive electrode plate cutter 402*a* is configured to cut the continuous upper positive electrode plate 401*a* into at least one upper positive electrode plate. A positive electrode plate cutter 402*b* is configured to cut the continuous lower positive electrode plate 401*b* into at least one lower positive electrode plate. The at least one upper positive electrode plate and the at least one lower positive electrode plate that are obtained after cutting have a same width.

Referring to FIG. 4 again, the station 40 may include a third image obtaining apparatus 403 in addition to the positive electrode plate cutters 402*a* and 402*b*, the upper positive electrode plate 401*a*, and the lower positive electrode plate 401*b*. After the negative electrode plate and the separator are bonded, the negative electrode plate may enter the station 40, and the third image obtaining apparatus 403 is triggered to collect image data, so as to obtain a fold position of the fold on the negative electrode plate. After the third image obtaining apparatus 403 collects the image data, the third image obtaining apparatus 403 may feed back the obtained fold position to the PLC control system.

During cutting the continuous positive electrode plate into the at least one upper positive electrode plate and the at least one lower positive electrode plate, the method 100 may further include: generating a first identifier for the at least one upper positive electrode plate and a second identifier for the at least one lower positive electrode plate.

The first identifier is different from the second identifier.

Exemplarily, the first identifier may be "1*", for example, "1033", and the second identifier may be "5*", for example, "5024". Alternatively, the first identifier may be "A*", and the second identifier may be "B*".

It should be understood that specific examples herein are only intended to help those skilled in the art better understand the embodiments of the present application, rather than limit the scope of the embodiments of the present application.

Specifically, the at least one upper positive electrode plate and the at least one lower positive electrode plate that are obtained after cutting the positive electrode plate may be sequentially conveyed to a next station. In the process of conveying the at least one upper positive electrode plate and the at least one lower positive electrode plate, the PLC control system may trigger, based on the at least one upper positive electrode plate and the at least one lower positive electrode plate, a fourth image obtaining apparatus to capture images and mark an electrode plate at a current moment as the first identifier or the second identifier at the same time.

As an example, a rule for conveying the upper positive electrode plate and the lower positive electrode plate may be preset. For example, the rule may include whether the upper positive electrode plate or the lower positive electrode plate is first conveyed. For another example, the rule may include conveying in the order of the upper positive electrode plate, the lower positive electrode plate, the upper positive electrode plate, the lower positive electrode plate, . . . , or in the order of the upper positive electrode plate, the upper positive electrode plate, the lower positive electrode plate, the lower positive electrode plate, the upper positive electrode plate, the upper positive electrode plate . . . .

In this way, every time a positive electrode plate is conveyed, the PLC control system may trigger the fourth image obtaining apparatus to capture images, and determine, according to the rule, whether an electrode plate at a current moment is an upper positive electrode plate or a lower positive electrode plate. If the electrode plate is the upper positive electrode plate, the first identifier is generated. If the electrode plate is the lower positive electrode plate, the second identifier is generated.

Figure 5:
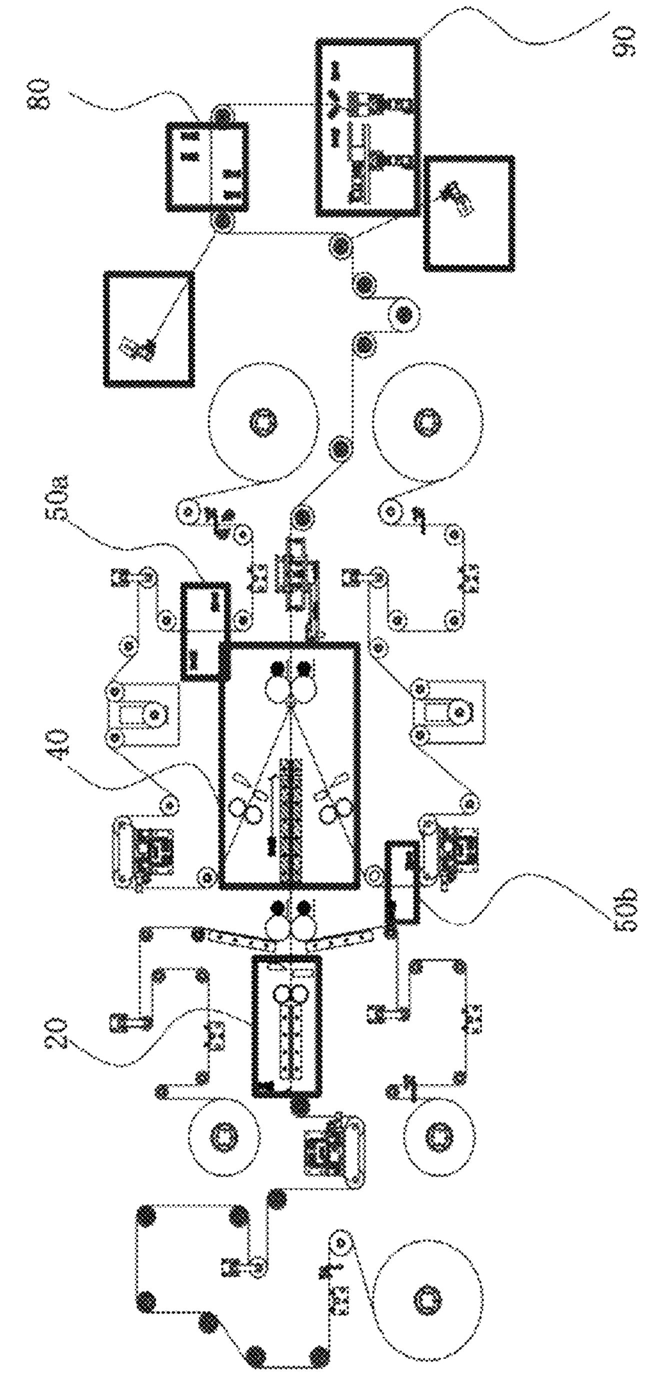
FIG. 5 is a schematic diagram of feeding by a stacking machine according to an embodiment of the present application.

As another example, as shown in FIG. 5, the fourth image obtaining apparatus may include a fourth image obtaining apparatus 50*a* and a fourth image obtaining apparatus 50*b*. When the upper positive electrode plate passes a position of the fourth image obtaining apparatus 50*a*, the PLC control system may trigger the fourth image obtaining apparatus 50*a* to capture images, and mark the upper positive electrode plate at the current moment as the first identifier. When the lower positive electrode plate passes a position of the fourth image obtaining apparatus 50*b*, the PLC control system may trigger the fourth image obtaining apparatus 50*b* to capture images, and mark the lower positive electrode plate at the current moment as the second identifier.

It should be understood that 20 and 40 in FIG. 5 may represent the above station and station 40, respectively.

After the first identifier and the second identifier are generated, as an example, the first identifier and the second identifier may be stored together. For example, the first identifier and the second identifier are stored alternately together based on the conveying order of the second electrode plates.

Considering that the first identifier and the second identifier are stored together, there may be a problem of confusion between the first identifier and the second identifier. Therefore, as another example, the first identifier may be stored in the first stack list, while the second identifier may be stored in the second stack list.

Figure 6:
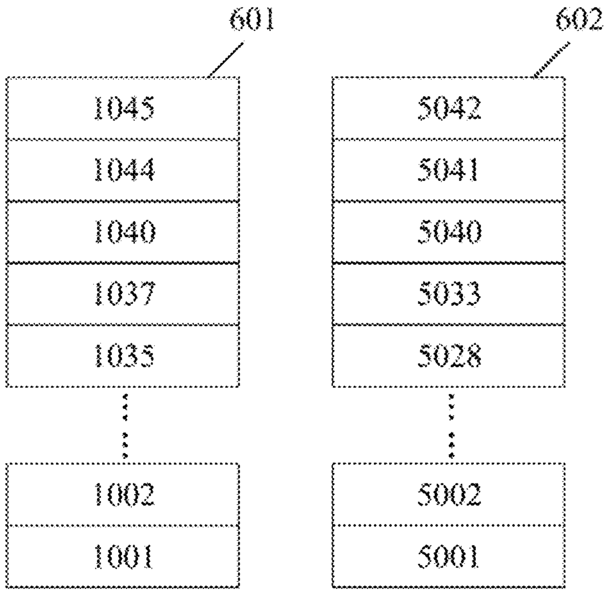
FIG. 6 is a schematic diagram of a first stack list and a second stack list according to an embodiment of the present application.

As shown in FIG. 6, 601 represents the first stack list, 602 represents the second stack list, the identifiers stored in the first stack list 601 are all the first identifier, and the identifiers stored in the second stack list 602 are all the second identifier.

It should be noted that the first identifier and the second identifier may be stored not only in the first stack list and the second stack list respectively but also in other places, which is not specifically limited in this embodiment of the present application.

In this technical solution, the first identifier for the upper positive electrode plate and the second identifier for the lower positive electrode plate are stored in different stack lists, which can effectively prevent the problem of confusion between the first identifier and the second identifier, for example, prevent the first identifier from being mistaken for the second identifier or the second identifier from being mistaken for the first identifier, thereby facilitating subsequent process.

Then, the at least one upper positive electrode plate and the at least one lower positive electrode plate may be conveyed alternately in the conveying order.

Optionally, a moment for conveying the upper positive electrode plate and the lower positive electrode plate may be determined based on the fold position obtained by the third image obtaining apparatus 403 at the station 40. Specifically, when the at least one fold on the negative electrode plate reaches the conveying position of the second electrode plates, the at least one upper positive electrode plate and the at least one lower positive electrode plate are conveyed alternately in the conveying order.

In this technical solution, when the fold on the negative electrode plate reaches the conveying position of the positive electrode plates, the at least one upper positive electrode plate and the at least one lower positive electrode plate are conveyed alternately, which can ensure precise alignment between the positive electrode plates and the negative electrode plate, and improve the precision of battery cells.

Further, in the process of conveying the positive electrode plates, the first identifier in the first stack list and the second identifier in the second stack list may be popped alternately based on the conveying order, and the popped first identifier and the popped second identifier are stored in a third stack list in the order of popping the first identifier and the second identifier alternately.

Identifiers in a same stack list are popped in a first-in first-out order. A sequence in the third stack list is the identifier sequence for the positive electrode plates.

Specifically, if it is determined based on the conveying order that the one to be first conveyed is the upper positive electrode plate, one of at least one first identifier in the first stack list is popped, followed by one of at least one second identifier in the second stack list, and then one of at least one first identifier in the first stack list. This alternating popping process continues in this manner. Alternatively, if it is determined based on the conveying order that the one to be first conveyed is the lower positive electrode plate, one of at least one second identifier in the second stack list is popped, followed by one of at least one first identifier in the first stack list, and then by one of the at least one second identifier in the second stack list. This alternating popping process continues in this manner.

Figure 7:
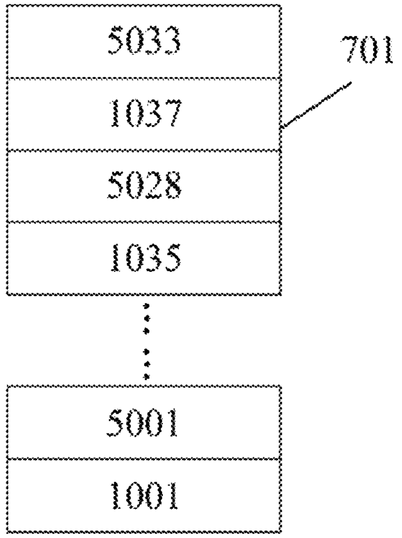
FIG. 7 is a schematic diagram of a third stack list according to an embodiment of the present application.

The first identifier and the second identifier that are popped alternately are stored in the third stack list. For example, the first identifier in the first stack list 601 and the identifier in the second stack list 602 that are shown in FIG. 6 are stored in the third stack list 701 shown in FIG. 7. It can be seen from FIG. 7 that the positive electrode plate to be first conveyed is the upper positive electrode plate, and the upper positive electrode plate is the electrode plate corresponding to the first identifier "1001".

After the first identifier and the second identifier are stored in the third stack list, step 130 may specifically include: sequentially popping the identifier sequence in the third stack list when the positive electrode plates are conveyed, and triggering, by the popped identifier sequence, the first image obtaining apparatus such that the image obtaining apparatus collects the first image data.

In other words, the first image data of each second electrode plate is sequentially collected based on the identifier sequence.

In the above technical solution, the first identifier and the second identifier are stored alternately in the third stack list based on the conveying order of the positive electrode plates, that is, the identifier sequence in the third stack list corresponds to the conveying order. In this way, when the first image obtaining apparatus is triggered by the popped identifier sequence to collect the first image data of the positive electrode plates, the collected first image data also corresponds to the conveying order of the positive electrode plates, which facilitates subsequent process processing. Further, the first image obtaining apparatus is triggered by the identifier sequence to collect the first image data, such that the first image data has a strong correlation with the identifier sequence. In this way, if an abnormality occurs in a battery cell, an electrode plate in which the abnormality occurs can be determined within a shorter period of time based on the first image data and its correlated identifier sequence.

Further, the image obtaining apparatus may include a first image obtaining sub-apparatus and a second image obtaining sub-apparatus. If the popped identifier is the first identifier in the identifier sequence, the first image obtaining sub-apparatus is triggered to collect the first image data; or if the popped identifier is the second identifier in the identifier sequence, the second image obtaining sub-apparatus is triggered to collect the first image data.

Optionally, the first image obtaining sub-apparatus and the second image obtaining sub-apparatus may be, but not limited to, cameras.

In addition, the method 100 may further include: storing the identifier sequence and the first image data. The identifier sequence is in a one-to-one correspondence with the first image data. For example, after the first image obtaining sub-apparatus and the second image obtaining sub-apparatus collect the first image data, they may send the first image data and the identifier sequence to a stacking upper-level system, and the stacking upper-level system summarizes the first image data and the identifier sequence into corresponding databases to store the identifier sequence and the first image data.

Figure 8:
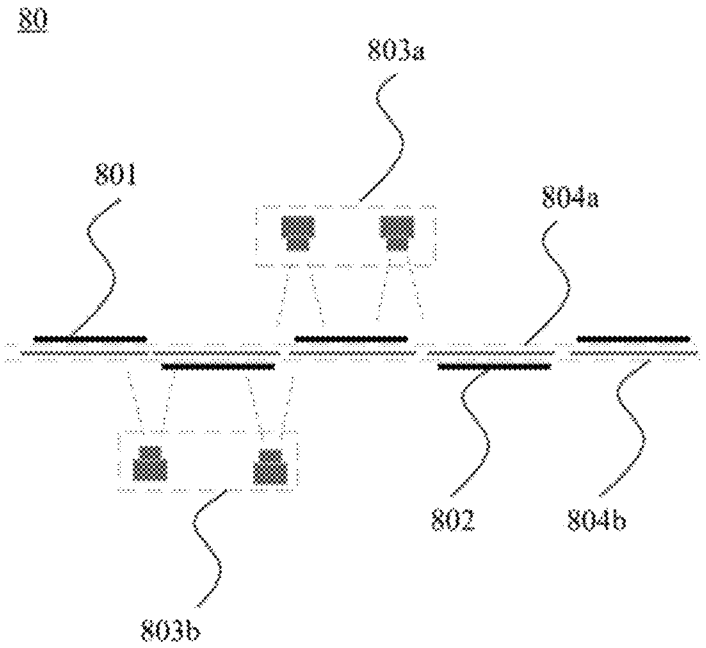
FIG. 8 is a schematic diagram of collection of first image data according to an embodiment of the present application.

A station 80 shown in FIG. 8 is used as an example. Exemplarily, the station 80 may be the station 20 in FIG. 5. The station 80 includes a first image obtaining sub-apparatus 803*a* and a second image obtaining sub-apparatus 803*b*, 804*a* and 804*b* respectively represent an upper separator and a lower separator, 801 represents an upper positive electrode plate, and 802 represents a lower positive electrode plate. When an identifier popped at a position of the first image obtaining sub-apparatus 803*a* is the first identifier, for example, "1001", the first image obtaining sub-apparatus 803*a* is triggered to capture images, and not to capture images in other cases. When an identifier popped at a position of the second image obtaining sub-apparatus 803*b* is the second identifier, for example, "5001", the second image obtaining sub-apparatus 803*b* is triggered to capture images, and not to capture images in other cases. The first image data obtained by image capturing and the identifier at the current moment are stored at the same time.

In the above technical solution, the identifier sequence and the first image data of the positive electrode plates are stored, such that the first image data of each positive electrode plate can be traced and queried. In this way, when an abnormality occurs in a battery cell, an electrode plate in which the abnormality occurs can be directly determined based on the identifier sequence and the first image data that are stored, which is not only simple to implement, but also effectively reduces the processing time.

Then, the negative electrode plate, the separator, and the positive electrode plate are stacked after being bonded. For example, stacking is performed at the station 40 shown in FIG. 5.

Figure 9:
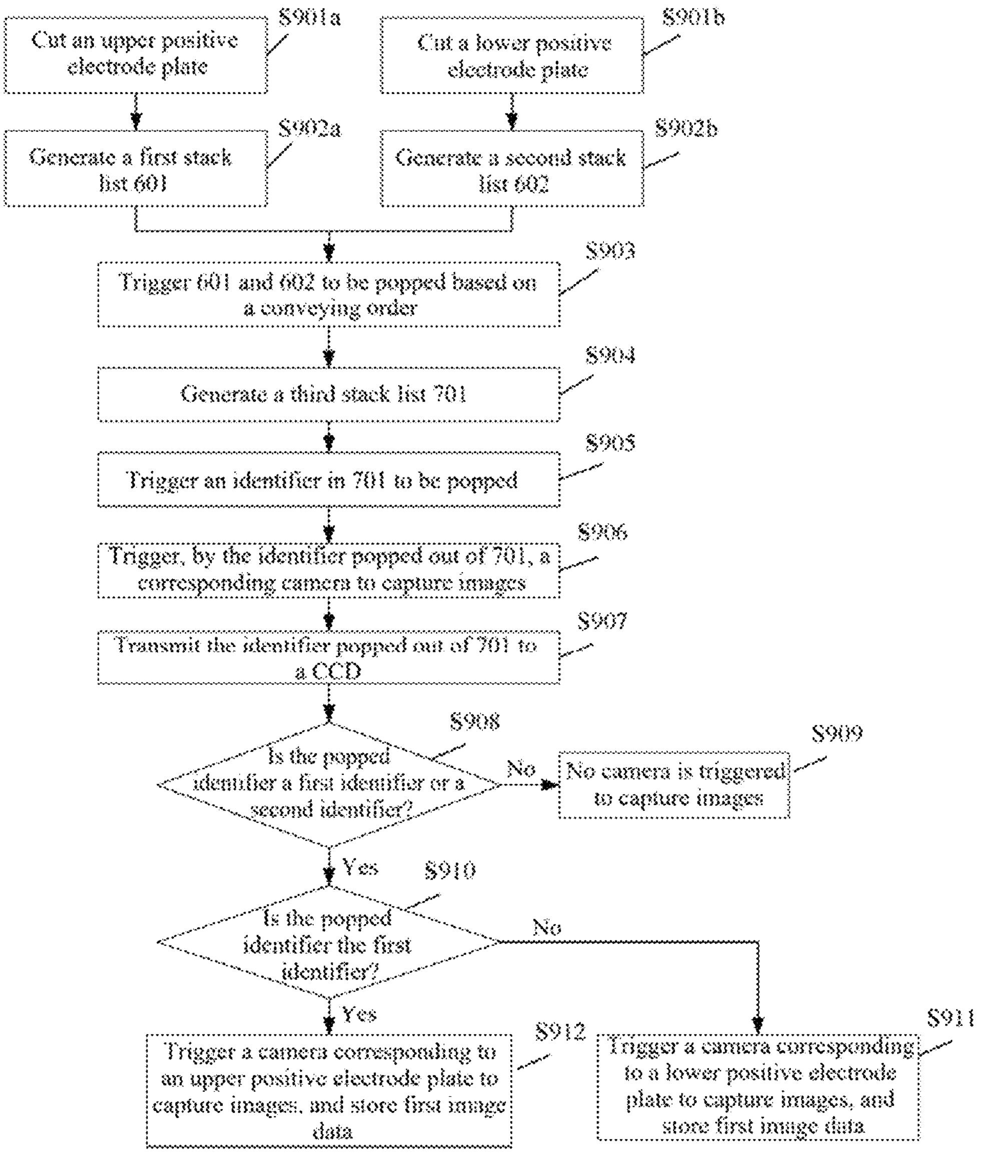
FIG. 9 is a possible schematic flowchart of steps 120 and 130 in a method 100 according to an embodiment of the present application.

In order to more clearly understand 120 and 130 in the electrode plate stacking method 100 in this embodiment of the present application, 120 and 130 in the method 100 according to a possible embodiment of the present application are described below with reference to FIG. 9.

In S901*a*, the upper positive electrode plate is cut at the station 40.

In S901*b*, the lower positive electrode plate is cut at the station 40.

In S902*a*, the first stack list 601 is generated, where the first stack list 601 includes the first identifier for the upper positive electrode plate.

In S902*b*, the second stack list 602 is generated, where the second stack list 602 includes the second identifier for the lower positive electrode plate.

In S903, the first identifier in the first stack list 601 and the second identifier in the second stack list 602 are triggered to be popped based on the conveying order of the positive electrode plates.

In S904, the third stack list 701 is generated, based on the conveying order, from the identifiers popped out of the first stack list 601 and the second stack list 602.

In S905, an identifier in the third stack list 701 is triggered to be popped at the station 80.

In S906, a corresponding camera is triggered, by the identifier popped out of the third stack list 701, to capture images.

In S907, the identifier popped out of the third stack list 701 is transmitted to the CCD.

In S908, whether the popped identifier is the first identifier or the second identifier is determined.

If the popped identifier is the first identifier or the second identifier, S910 is performed; or if the popped identifier is neither the first identifier nor the second identifier, S909 is performed.

In S909, no camera is triggered to capture images.

In S910, whether the popped identifier is the first identifier is determined.

If the popped identifier is the first identifier, S912 is performed; or if the popped identifier is not the first identifier, S911 is performed.

In S911, a camera corresponding to the lower positive electrode plate is triggered to capture images, and the first image data is stored.

In S912, a camera corresponding to the upper positive electrode plate is triggered to capture images, and the first image data is stored.

The method embodiments of the embodiments of the present application are described in detail above, and the apparatus embodiments of the embodiments of the present application are described below. The apparatus embodiments correspond to the method embodiments. Therefore, for the parts that are not described in detail, refer to the foregoing method embodiments. The apparatus may implement any possible implementation in the above methods.

Figure 10:
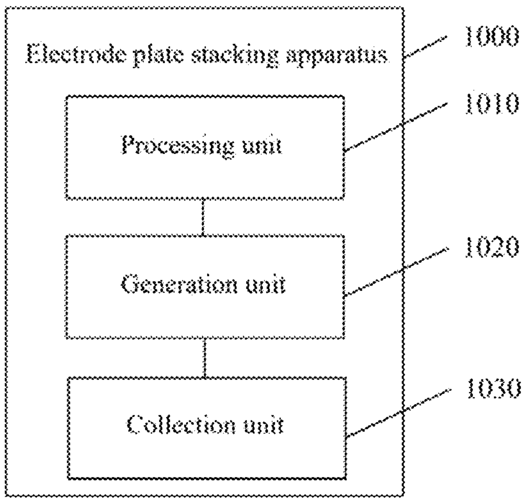
FIG. 10 is a schematic block diagram of an electrode plate stacking apparatus according to an embodiment of the present application.

FIG. 10 is a schematic block diagram of an electrode plate stacking apparatus 1000 according to an embodiment of the present application. The stacking apparatus 1000 may perform the electrode plate stacking method 100 in the above embodiments of the present application. As shown in FIG. 10, the stacking apparatus 1000 may include: a processing unit 1010 configured to determine, based on a first electrode plate, a conveying order of a plurality of second electrode plates, the first electrode plate being a continuous electrode plate, the plurality of second electrode plates including at least one upper electrode plate and at least one lower electrode plate, the plurality of second electrode plates being discontinuous electrode plates, and the conveying order being used for conveying the at least one upper electrode plate and the at least one lower electrode plate alternately; a generation unit 1020 configured to generate an identifier sequence for the plurality of second electrode plates based on the conveying order; and a collection unit 1030 configured to collect first image data of each of the plurality of second electrode plates based on the identifier sequence in a process of conveying the plurality of second electrode plates in the conveying order.

Optionally, in an embodiment of the present application, the processing unit 1010 is further configured to: store the identifier sequence and the first image data, where the identifier sequence is in a one-to-one correspondence with the first image data.

Optionally, in an embodiment of the present application, the processing unit 1010 is specifically configured to: obtain fold information of the first electrode plate, the fold information being used to indicate whether at least one fold on the first electrode plate is located on an upper surface or a lower surface of the first electrode plate; and determine the conveying order based on the fold information.

Optionally, in an embodiment of the present application, if the fold information is used to indicate that a first fold of the at least one fold is located on the upper surface of the first electrode plate, one of the plurality of second electrode plates that is to be first conveyed is a first upper electrode plate of the at least one upper electrode plate; or if the fold information is used to indicate that the first fold of the at least one fold is located on the lower surface of the first electrode plate, one of the plurality of second electrode plates that is to be first conveyed is a first lower electrode plate of the at least one lower electrode plate.

Optionally, in an embodiment of the present application, the generation unit 1020 is further configured to: generate a first identifier for the at least one upper electrode plate and a second identifier for the at least one lower electrode plate when the continuous second electrode plate is cut into the at least one upper electrode plate and the at least one lower electrode plate.

The processing unit 1010 is further configured to: store the first identifier in a first stack list and store the second identifier in a second stack list.

Optionally, in an embodiment of the present application, the processing unit 1010 is further configured to: pop the first identifier in the first stack list and the second identifier in the second stack list alternately based on the conveying order, where identifiers in a same stack list are popped in a first-in first-out order; and store the popped first identifier and the popped second identifier in a third stack list based on the order of popping the first identifier and the second identifier alternately, a sequence in the third stack list being the identifier sequence.

Optionally, in an embodiment of the present application, the stacking apparatus 1000 includes a first image obtaining apparatus, and the processing unit 1010 is further configured to: sequentially pop the identifier sequence in the third stack list when the second electrode plates are conveyed; and trigger the first image obtaining apparatus by the popped identifier sequence such that the image obtaining apparatus collects the first image data.

Optionally, in an embodiment of the present application, the first image obtaining apparatus includes a first image obtaining sub-apparatus and a second image obtaining sub-apparatus, and the processing unit 1010 is specifically configured to: if the popped identifier is the first identifier in the identifier sequence, trigger the first image obtaining sub-apparatus to collect the first image data; or if the popped identifier is the second identifier in the identifier sequence, trigger the second image obtaining sub-apparatus to collect the first image data.

Optionally, in an embodiment of the present application, the processing unit 1010 is specifically configured to: perform cut hole detection on the first electrode plate; and after a cut hole in the first electrode plate is detected, trigger a second image obtaining apparatus to collect second image data of the first electrode plate, the second image data being used to obtain the fold information.

Optionally, in an embodiment of the present application, the stacking apparatus further includes: a conveying unit configured to: when the at least one fold reaches a conveying position of the plurality of second electrode plates, convey the at least one upper electrode plate and the at least one lower electrode plate alternately in the conveying order.

Optionally, in an embodiment of the present application, the first electrode plate is a negative electrode plate, the second electrode plate is a positive electrode plate, the upper electrode plate is an upper positive electrode plate, and the lower electrode plate is a lower positive electrode plate.

It should be understood that the stacking apparatus 1000 may implement the corresponding operations of the method 100, and for the sake of brevity, details are not repeated herein. Correspondingly, the stacking apparatus 1000 may implement same technical effects as the method 100, and for the sake of brevity, details are not repeated herein.

Figure 11:
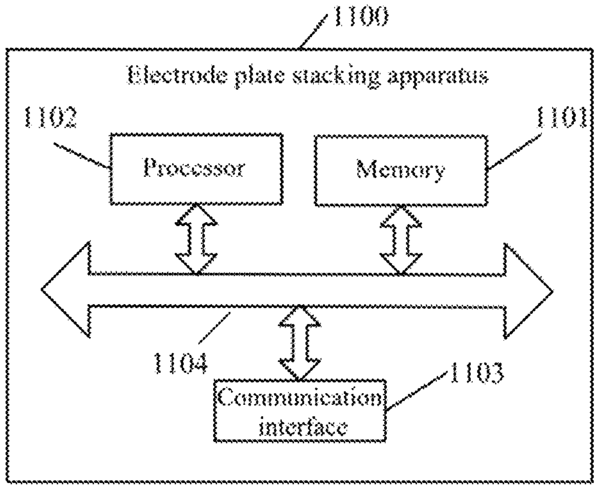
FIG. 11 is a schematic block diagram of an electrode plate stacking apparatus according to an embodiment of the present application.

FIG. 11 is a schematic diagram of a hardware structure of an electrode plate stacking apparatus 1100 according to an embodiment of the present application. The stacking apparatus 1100 includes a memory 1101, a processor 1102, a communication interface 1103, and a bus 1104. The memory 1101, the processor 1102, and the communication interface 1103 are communicatively connected to each other through the bus 1104.

The memory 1101 may be a read-only memory (ROM), a static storage device, and a random access memory (RAM). The memory 1101 may store a program, and when the program stored in the memory 1101 is executed by the processor 1102, the processor 1102 and the communication interface 1103 are configured to perform the steps of the electrode plate stacking method in the embodiments of the present application.

The processor 1102 may be a general-purpose central processing unit (CPU), a microprocessor, an application-specific integrated circuit (ASIC), a graphics processing unit (GPU), or one or more integrated circuits, to execute related programs to implement functions required to be performed by units in the apparatus in the embodiments of the present application, or perform the electrode plate stacking method in the embodiments of the present application.

The processor 1102 may alternatively be an integrated circuit chip having a signal processing capability. In an implementation process, the steps of the electrode plate stacking method in the embodiments of the present application may be implemented by using a hardware integrated logic circuit in the processor 1102, or by using instructions in the form of software.

The processor 1102 may alternatively be a general-purpose processor, a digital signal processor (DSP), an ASIC, a field-programmable gate array (FPGA) or another programmable logic device, a discrete gate or transistor logic device, or a discrete hardware component. Various methods, steps, and logical block diagrams disclosed in the embodiments of the present application may be implemented or executed. The general-purpose processor may be a microprocessor, or the processor may be any conventional processor, etc. The steps of the methods disclosed with reference to the embodiments of the present application may be directly presented as being performed and completed by a hardware processor, or performed and completed by a combination of hardware and a software module in a processor. The software module may be located in a mature storage medium in the art, such as a random access memory, a flash memory, a read-only memory, a programmable read-only memory, an electrically erasable programmable memory, or a register. The storage medium is located in the memory 1101, and the processor 1102 reads the information in the memory 1101, and completes, in combination with its hardware, functions required to be performed by units included in the stacking apparatus 1100 in the embodiments of the present application, or perform the electrode plate stacking method in the embodiments of the present application.

The communication interface 1103 uses a transceiver apparatus such as, but not limited to, a transceiver to implement communication between the stacking apparatus 1100 and other devices or communication networks.

The bus 1104 may include a path for transferring information between various components (for example, the memory 1101, the processor 1102, and the communication interface 1103) of the stacking apparatus 1100.

It should be noted that although the stacking apparatus 1100 is shown as including only the memory, the processor, and the communication interface, during specific implementation, those skilled in the art should understand that the stacking apparatus 1100 may further include other components necessary for normal operation. In addition, according to specific requirements, those skilled in the art should understand that the stacking apparatus 1100 may further include hardware components for implementing other additional functions. In addition, those skilled in the art should understand that the stacking apparatus 1100 may alternatively include only components necessary to implement the embodiments of the present application, and does not necessarily include all the components shown in FIG. 11.

An embodiment of the present application further provides a stacking machine, which may include the electrode plate stacking apparatus shown in FIG. 10 or FIG. 11.

While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. An electrode plate stacking method, comprising:

collecting data of a first electrode plate fed to a stacking apparatus, the first electrode plate being a continuous electrode plate;

determining, based on the data of the first electrode plate, a conveying order of a plurality of second electrode plates, the plurality of second electrode plates comprising at least one upper electrode plate and at least one lower electrode plate, the plurality of second electrode plates being discontinuous electrode plates, and the conveying order indicating an order for conveying the at least one upper electrode plate to an upper surface of the first electrode plate and the at least one lower electrode plate to a lower surface of the first electrode plate alternately;

generating an identifier sequence for the plurality of second electrode plates based on the conveying order that represents identifiers generated for each of the plurality of second electrode plates arranged in the conveying order;

collecting first image data of each of the plurality of second electrode plates based on the identifier sequence and storing the first image data with the identifiers generated for each of the plurality of second electrode plates in a process of conveying the plurality of second electrode plates in the conveying order;

alternately conveying the at least one upper electrode plate among the plurality of second electrode plates to the upper surface of the first electrode plate and the at least one lower electrode plate among the plurality of second electrode plates to the lower surface of the first electrode plate; and stacking the first electrode plate and the plurality of second electrode plates by folding the first electrode plate using the stacking apparatus.

2. The stacking method according to claim 1, further comprising:

storing the identifier sequence and the first image data, wherein the identifier sequence is in a one-to-one correspondence with the first image data.

3. The stacking method according to claim 1, wherein the determining, based on the data of the first electrode plate, the conveying order of the plurality of second electrode plates comprising:

obtaining fold information of the first electrode plate based on the data of the first electrode plate, the fold information being used to indicate whether at least one fold on the first electrode plate is located on the upper surface or the lower surface of the first electrode plate; and determining the conveying order based on the fold information.

4. The stacking method according to claim 3, wherein in response to the fold information indicating that a first fold of the at least one fold is located on the upper surface of the first electrode plate, the conveying order is determined such that the first of the plurality of second electrode plates that is to be conveyed is a first upper electrode plate; or in response to the fold information indicating that the first fold of the at least one fold is located on the lower surface of the first electrode plate, the conveying order is determined such that the first of the plurality of second electrode plates that is to be conveyed is a first lower electrode plate.

5. The stacking method according to claim 3, wherein the obtaining of the fold information of the first electrode plate comprises:

performing cut hole detection on the first electrode plate; and after a cut hole in the first electrode plate is detected, triggering a second image obtaining apparatus to collect second image data of the first electrode plate, the second image data being used to obtain the fold information.

6. The stacking method according to claim 3, further comprising:

in response to the at least one fold reaches a conveying position of the plurality of second electrode plates, conveying the at least one upper electrode plate among the plurality of second electrode plates and the at least one lower electrode plate among the plurality of second electrode plates alternately in the conveying order.

7. The stacking method according to claim 1, further comprising:

generating a first identifier among the identifiers for the at least one upper electrode plate among the plurality of second electrode plates and a second identifier among the identifiers for the at least one lower electrode plate among the plurality of second electrode plates in response to a continuous second electrode plate is cut into the at least one upper electrode plate among the plurality of second electrode plates and the at least one lower electrode plate among the plurality of second electrode plates; and storing the first identifier among the identifiers in a first stack list and storing the second identifier among the identifiers in a second stack list.

8. The stacking method according to claim 7, wherein the generating the identifier sequence for the plurality of second electrode plates based on the conveying order comprises:

storing the first identifier among the identifiers from the first stack list and the second identifier among the identifiers from the second stack list alternately into a third stack list based on the conveying order, wherein identifiers in a same stack list are stored in a first-in first-out order, a sequence of the third stack list being the identifiers sequence.

9. The stacking method according to claim 8, wherein the stacking method is applied to a stacking machine the stacking machine includes the stacking apparatus, and the stacking apparatus includes a first image obtaining apparatus, and the collecting the first image data of each of the plurality of second electrode plates based on the identifier sequence includes sequentially triggering the first image obtaining apparatus based on the identifier sequence such that the first image obtaining apparatus collects the first image data in the order of the identifier sequence.

10. The stacking method according to claim 9, wherein the first image obtaining apparatus comprises a first image obtaining sub-apparatus and a second image obtaining sub-apparatus, and the sequentially triggering of the first image obtaining apparatus is based on the identifier sequence such that the image obtaining apparatus collects the first image data comprises:

in response to the identifier being the first identifier among the identifiers in the identifier sequence, triggering the first image obtaining sub-apparatus to collect the first image data; or in response to the identifier being the second identifier among the identifiers in the identifier sequence, triggering the second image obtaining sub-apparatus to collect the first image data.

11. The stacking method according to claim 1, wherein the first electrode plate is a negative electrode plate, and the plurality of second electrode plates are positive electrode plates.

12. An electrode plate stacking apparatus, comprising:

a conveyor;

a folding apparatus; and circuitry configured to:

collect data of a first electrode plate fed to the electrode plate stacking apparatus, the first electrode plate being a continuous electrode plate;

determine, based on the first electrode plate, a conveying order of a plurality of second electrode plates, the plurality of second electrode plates comprising at least one upper electrode plate and at least one lower electrode plate, the plurality of second electrode plates being discontinuous electrode plates, and the conveying order indicating an order for conveying the at least one upper electrode plate among the plurality of second electrode plates to an upper surface of the first electrode plate and the at least one lower electrode plate among the plurality of second electrode plates to a lower surface of the first electrode plate alternately;

generate an identifier sequence for the plurality of second electrode plates based on the conveying order that represents identifiers generated for each of the plurality of second electrode plates arranged in the conveying order;

collect first image data of each of the plurality of second electrode plates based on the identifier sequence and storing the first image data with the identifiers of the plurality of second electrode plates in a process of conveying the plurality of second electrode plates in the conveying order;

control the conveyor to alternately convey the at least one upper electrode plate among the plurality of second electrode plates to the upper surface of the first electrode plate and the at least one lower electrode plate among the plurality of second electrode plates to the lower surface of the first electrode plate; and control the folding apparatus to stack the first electrode plate and the plurality of second electrode plates by folding the first electrode plate.

13. The stacking apparatus according to claim 12, wherein the circuitry is further configured to:

store the identifier sequence and the first image data, wherein the identifier sequence is in a one-to-one correspondence with the first image data;

obtain fold information of the first electrode plate based on the data of the first electrode plate, the fold information being used to indicate whether at least one fold on the first electrode plate is located on the upper surface or the lower surface of the first electrode plate; and determine the conveying order based on the fold information.

14. The stacking apparatus according to claim 13, wherein in response to the fold information indicating that a first fold of the at least one fold is located on the upper surface of the first electrode plate, the conveying order is determined such that the first of the second electrode plates that is to be conveyed is a first upper electrode plate; or in response to the fold information indicating that the first fold of the at least one fold is located on the lower surface of the first electrode plate, the conveying order is determined such that the first of the second electrode plates that is to be conveyed is a first lower electrode plate.

15. The stacking apparatus according to claim 13, wherein the circuitry is specifically configured to:

perform cut hole detection on the first electrode plate; and after a cut hole in the first electrode plate is detected, trigger a second image obtaining apparatus to collect second image data of the first electrode plate, the second image data being used to obtain the fold information.

16. The stacking apparatus according to claim 13, wherein:

the conveyor is configured to: in response to the at least one fold reaches a conveying position of the plurality of second electrode plates, convey the at least one upper electrode plate among the plurality of second electrode plates and the at least one lower electrode plate among the plurality of second electrode plates alternately in the conveying order, the first electrode plate is a negative electrode plate, and the plurality of second electrode plates are positive electrode plates.

17. The stacking apparatus according to claim 12, wherein the circuitry is further configured to:

generate a first identifier among the identifiers for the at least one upper electrode plate among the plurality of second electrode plates and a second identifier among the identifiers for the at least one lower electrode plate among the plurality of second electrode plates in response to a continuous second electrode plate being cut into the at least one upper electrode plate among the plurality of second electrode plates and the at least one lower electrode plate among the plurality of second electrode plates;

store the first identifier among the identifiers in a first stack list and store the second identifier among the identifiers in a second stack list; and store the first identifier among the identifiers from the first stack list and the second identifier among the identifiers from the second stack list alternately into a third stack list based on the conveying order, wherein identifiers in a same stack list are stored in a first-in first-out order, a sequence of the third stack list being the identifier sequence.

18. The stacking apparatus according to claim 17, further comprising a first image obtaining apparatus, and the circuitry being further configured to:

sequentially trigger the first image obtaining apparatus based on the identifier sequence such that the image obtaining apparatus collects the first image data in the order of the identifier sequence.

19. The stacking apparatus according to claim 18, wherein the first image obtaining apparatus comprises a first image obtaining sub-apparatus and a second image obtaining sub-apparatus, and the circuitry is specifically configured to:

in response to the identifier being the first identifier among the identifiers in the identifier sequence, trigger the first image obtaining sub-apparatus to collect the first image data; or in response to the identifier being the second identifier among the identifiers in the identifier sequence, trigger the second image obtaining sub-apparatus to collect the first image data.

20. An electrode plate stacking machine, comprising:

an electrode plate stacking apparatus, including:

a conveyor;

a folding apparatus; and circuitry configured to:

collect data of a first electrode plate fed to the electrode plate stacking apparatus, the first electrode plate being a continuous electrode plate; and determine, based on the first electrode plate, a conveying order of a plurality of second electrode plates, the plurality of second electrode plates comprising at least one upper electrode plate and at least one lower electrode plate, the plurality of second electrode plates being discontinuous electrode plates, and the conveying order indicating an order for conveying the at least one upper electrode plate among the plurality of second electrode plates to an upper surface of the first electrode plate and the at least one lower electrode plate among the plurality of second electrode plates to a lower surface of the first electrode plate alternately;

generate an identifier sequence for the plurality of second electrode plates based on the conveying order that represents identifier generated for each of the plurality of second electrode plates arranged in the conveying order; and collect first image data of each of the plurality of second electrode plates based on the identifier sequence and storing the first image data with the identifiers of the plurality of second electrode plates in a process of conveying the plurality of second electrode plates in the conveying order;

control the conveyor to alternately convey the at least one upper electrode plate among the plurality of second electrode plates to the upper surface of the first electrode plate and the at least one lower electrode plate among the plurality of second electrode plates to the lower surface of the first electrode plate; and control the folding apparatus to stack the first electrode plate and the plurality of second electrode plates by folding the first electrode plate.

* * * * *